No. 653,764. Patented July 17, 1900.
H. J. BREWER.
ELECTROGALVANIC BATTERY.
(Application filed July 7, 1899.)
(No Model.) 2 Sheets—Sheet 1.
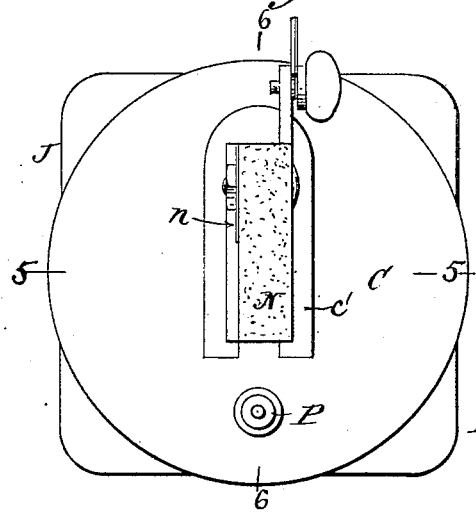
Fig. 1.
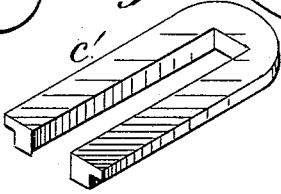
Fig. 3.
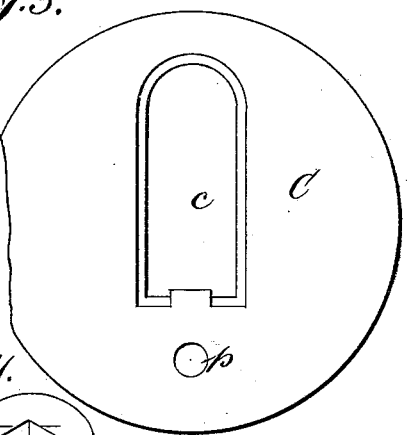
Fig. 2.
Fig. 4.
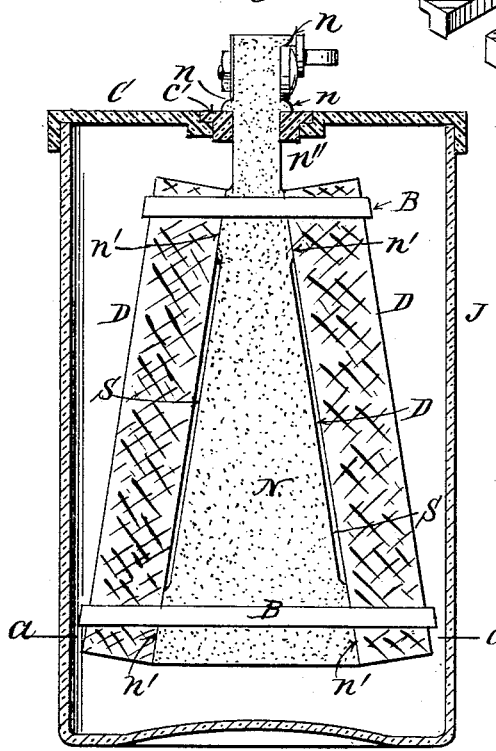
Fig. 5.
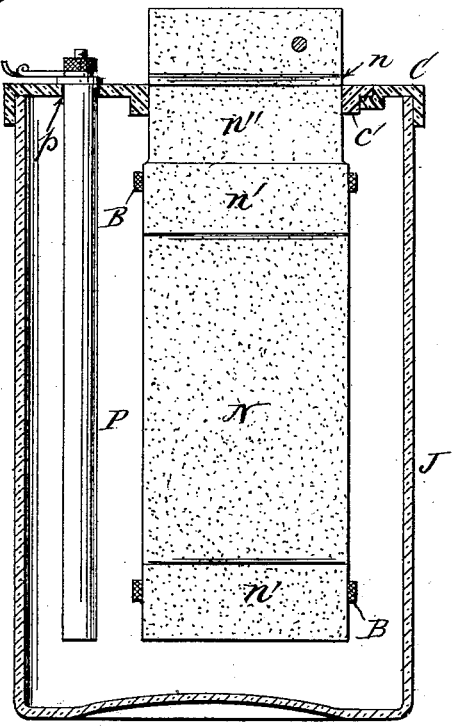
Fig. 6.
Witnesses:
D. W. Gardner
Louis Rowley
Inventor:
Horatio J. Brewer
By his Attorney
George William Platt

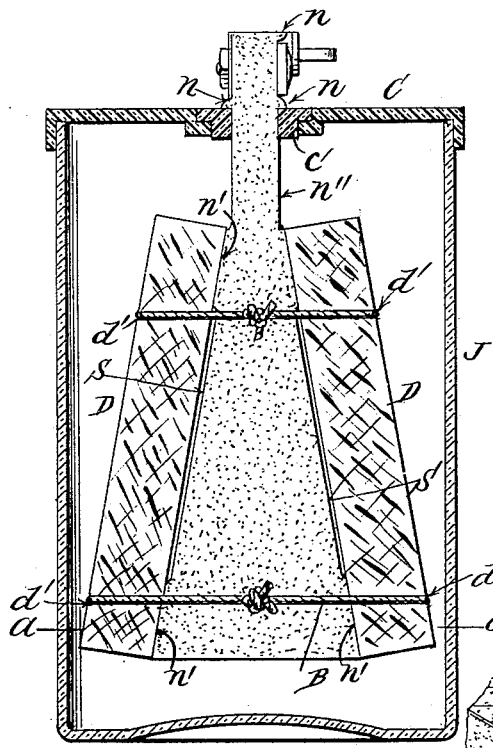
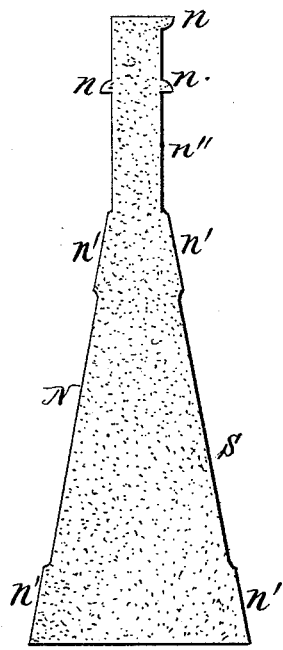
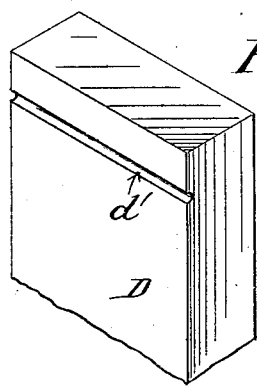
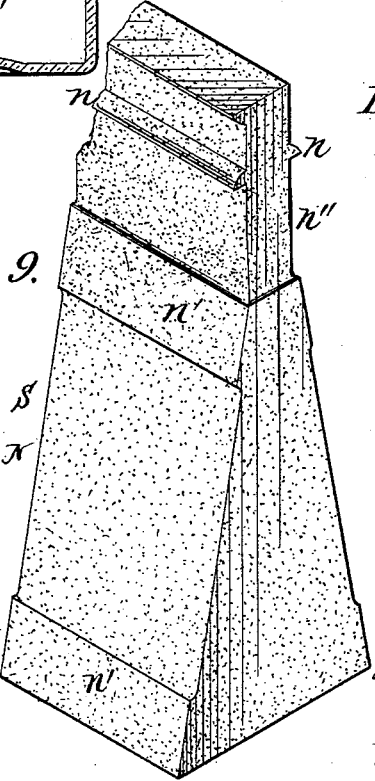
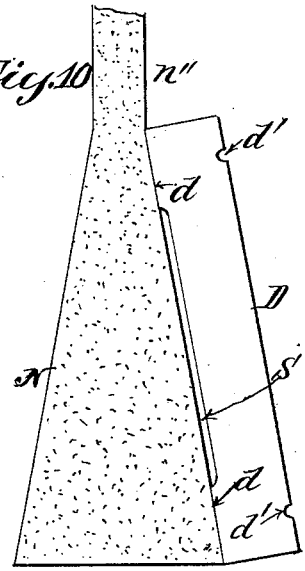

UNITED STATES PATENT OFFICE.

HORATIO J. BREWER, OF NEW YORK, N. Y.

ELECTROGALVANIC BATTERY.

SPECIFICATION forming part of Letters Patent No. 653,764, dated July 17, 1900.

Application filed July 7, 1899. Serial No. 723,056. (No model.)

*To all whom it may concern:*

Be it known that I, HORATIO J. BREWER, a citizen of the United States, residing in the city, county, and State of New York, have invented certain new and useful Improvements in Electrogalvanic Batteries, of which the following is a specification sufficient to enable others skilled in the art to which the invention appertains to make and use the same.

My invention relates to galvanic batteries in which slabs of depolarizing material—such as peroxid of manganese, carbon, &c.—are used in conjunction with a carbon electrode to form the conducting or electronegative element, as in the Leclanché battery. The depolarizing-slabs have heretofore been applied to flat vertical electrodes by means of elastic rubber bands, the tension of which has been relied upon to force the opposed surfaces of carbon and conglomerate into intimate mechanical and electrical contact. When first applied, the elastic binders are effective for the purpose, but they soon deteriorate, gradually losing their strength and elasticity, and finally allow the depolarizing-slabs to slip to the bottom of the jar, there to form a short circuit through the accumulated precipitates of zinc and carbon with the positive electrode, thereby rendering the battery useless. Even a slight decrease in the pressure exerted by the elastic binders increases the internal resistance of the battery, since the conductivity and effectiveness of the electronegative element depend largely upon the character of the contact between the carbon electrode and the conglomerate.

My improvement is designed to insure and maintain perfect contact between the carbon electrode and depolarizing-slabs by taking up and compensating for any slackness upon the part of the binders, whether the latter are elastic or inelastic, incidentally rendering the use of inelastic binders practicable, a result not heretofore attained.

The invention consists, essentially, in forming the carbon electrode with inclined bearing-surfaces for contact with the surfaces of the slabs of conglomerate, said bearing-surfaces converging upward, so that the weight of the slabs when the latter are held to the carbon electrode by suitable binders tends constantly to hold the binders taut, with the opposed surfaces of carbon and conglomerate in close contact. In other words, the carbon electrode is made to act as an inverted wedge between the slabs and binders, over which the slabs slip downward until arrested by the tightening of the binders. Thus inelastic binders will sustain the slabs in position indefinitely, or the deterioration of elastic binders will be compensated for so long as they remain intact.

In the accompanying drawings, Figure 1 is a top view of a battery-cell embodying my improvements; Fig. 2, a view of the cover thereof, partly broken away; Fig. 3, a top view of the collar for sustaining the carbon electrode, &c.; Fig. 4, an isometrical view of the same. Fig. 5 is a vertical section of the jar and cover, taken on plane of line 5 5, Fig. 1, my improved electronegative element being shown in elevation. Fig. 6 is a vertical section of the jar and cover on plane of line 6 6, Fig. 1, the carbon electrode and the zinc electrode being shown in elevation. Fig. 7 is a view similar to Fig. 5, illustrating the use of inelastic binders; Fig. 8, an end elevation of my improved carbon electrode; Fig. 9, an isometrical view of my improved carbon electrode, partly broken away. Fig. 10 illustrates a modification in the construction of my improved electronegative element. Fig. 11 is an isometrical view of the upper portion of a slab of conglomerate formed with a binder-groove.

In the accompanying drawings, J represents the usual containing-jar, of glass or other desired material, over the upper end of which fits the flat cover C, formed with an aperture $p$, through which the zinc or positive electrode P protrudes, and with a larger opening $c$, through which the upper end of the negative or carbon electrode N is passed. The means employed for suspending the carbon electrode N from the cover is of secondary importance and forms no part of my present invention, as any suitable mechanical expedient may be substituted for the construction herein shown, in which a bifurcated collar $c'$ is interposed between the shoulders $n\,n$ on the sides of the carbon N and the cover C, the latter being countersunk to receive and lock the collar in position, as will be seen by reference to Figs. 1 to 4.

Below the neck $n''$ of the carbon N its sides flare downward and outward at an angle with relation to each other and to the axial plane of the carbon. The degree of inclination of the bearing-surfaces $n'$ $n'$ from the vertical is not necessarily prescribed, but is preferably sufficient to throw the centers of gravity of the slabs D D of depolarizing conglomerate within the lower or base line of the carbon electrode N. In any case the carbon electrode forms, essentially, an inverted wedge, upon which the slabs D D are suspended by binders B B, which hold the bearing-surfaces of the slabs in contact with the bearing-surfaces $n'$ $n'$ of the carbon electrodes and parallel thereto under all conditions of use.

I have herein shown the electrode N as supporting two slabs of conglomerate material D D, although it is obvious that the same principle of construction may be utilized in adapting the carbon electrode to the support of a single slab or of more than two slabs, the essential feature in this connection being the converging of the bearing-surfaces $n'$ $n'$ upward, so as to incline the bearing-surfaces of the slab or slabs with relation to the axial line of the electrode when held thereto by the binders B B.

The bearing-surfaces $n'$ $n'$ of the carbon electrode are preferably formed to protrude beyond the body or intermediate portions of the carbon, as shown in Figs. 5 to 9, inclusive, for the purpose of creating spaces S for the circulation of the exciting liquid between the conglomerate and the carbon, although, if preferred, the sides of the carbon electrode may be made each in one plane, as indicated in Fig. 10, and the spacing S between the carbons and electrode be attained by forming the conglomerate slabs, as heretofore, with the protruding bearing-surfaces $d$ $d$.

The binders B B may consist of bands of rubber or other elastic material, as indicated in Figs. 5 and 6, or of loops of cord or other textile or fibrous material woven, twisted, or otherwise formed into bands which are more or less inelastic and unyielding, in which case the outer sides of the depolarizing-slabs D D may be formed with shoulders $d'$ $d'$, as in Figs. 7, 10, and 11, to engage the binders and obviate all danger of accidental slip or displacement during handling or transportation. In fact, even rigid yokes of wood, compressed fiber, or other non-flexible material may be used, if desired, the essential feature in the binders B B being that when placed in position around the carbon electrode and the conglomerate slab or slabs the area inclosed by any one of them is less than the greatest area in cross-section of the carbon and conglomerate combined—that is to say, less than the area of a horizontal section, taken just above the bottom of the element, as upon the line $a$ $a$, Figs. 5 and 7.

Any looseness or play in the binders existing or arising from any cause is immediately taken up by the conglomerate slabs, which tend to slip downward over the carbon electrode, thus tightening the binders and securing themselves firmly in position. In the case of elastic binders this wedging outward of the conglomerate slabs will compensate for any deterioration or lack of resilience in the binders until the bands actually break asunder, thus prolonging the life and effectiveness of the battery; but one of the main advantages attained by my special construction of carbon electrode is that it enables me to use inelastic and even rigid binders, which are practically indestructible, and will maintain the desired relation between carbon electrode and conglomerate slabs until the slabs are exhausted without allowing them to touch the bottom of the jar. Furthermore, the mechanical and electrical contact is maintained throughout between the opposed surfaces of carbon and of the conglomerate slabs by reason of the weight of the latter independent of any inherent power or elasticity in the binders themselves.

By my invention comparatively-cheap permanent binders, of string or cord, may be substituted for the more expensive temporary rubber bands heretofore used in binding the depolarizing-slabs to the electrode, with the result that increase of internal resistance in the battery by reason of looseness of contact between the carbon electrode and conglomerate slabs, as well as all danger of short-circuiting or destruction by contact of the conglomerate slabs with the floor of the jar, is avoided.

In my concurrent application, Serial No. 723,055, filed herewith, I show and claim a tubiform conglomerate suspended upon the inclined edges of a carbon electrode, binders being dispensed with. In my concurrent application, Serial No. 723,057, filed herewith, I show and claim binders in combination with interlocking carbon electrode and conglomerate slabs. These are distinct from my present invention.

I am aware that electrodes have been made with vertical sides or bearing-surfaces inclined with relation to each other horizontally. These I expressly disclaim, as they would be useless for my purpose. The inclined-plane bearing-surface, which is essential in carrying out my invention, has an oblique inclination with relation to the axial or vertical plane of the electrode sufficient to throw more or less of the weight of the conglomerate slab thereon and to tighten the confining band or bands by tending to force the slabs outward against said bands under the action of gravity.

In the use of the word "binders" I refer to an encircling or surrounding band or bands made preferably, though not necessarily, of flexible material adapted to bind the conglomerate slab or slabs and the carbon electrode together, with their opposed surfaces in close contact, the area inclosed by each band being less than the horizontal section of the electronegative element as a whole taken on any plane below the position of the band.

What I claim as my invention, and desire to secure herein by Letters Patent, is—

1. In a galvanic battery, an electronegative element consisting of a carbon electrode having a flat bearing-surface in the form of an oblique plane converging upward with relation to a vertical line, passing through the body of the electrode, a slab of conglomerate material formed with a flat surface supported on said oblique bearing-surface on the carbon electrode, and a band surrounding the said electrode and the said slab and binding them together, whereby the weight of the slab is utilized, in conjunction with the oblique bearing-surface on the electrode to keep the band taut, for the purpose and substantially in the manner described.

2. In a galvanic battery, an electronegative element consisting of a carbon electrode having a flat bearing-surface in the form of an oblique plane converging upward with relation to a vertical line, passing through the body of the electrode, a slab of conglomerate material formed with a flat surface supported on said oblique bearing-surface on the carbon electrode, and a flexible band binding the said electrode and the said slab together, whereby the weight of the slab is utilized, in conjunction with the oblique bearing-surface on the electrode, to keep the band taut, for the purpose and substantially in the manner set forth.

3. In a galvanic battery, an electronegative element consisting of a carbon electrode having bearing-surfaces in the form of oblique planes converging upward, slabs of conglomerate material formed with flat surfaces for contact with said oblique bearing-surfaces on the carbon electrode, and a flexible band binding the said electrode and slabs together, whereby the weight of the slabs is utilized, in conjunction with the oblique bearing-surfaces of the electrode, to keep the band taut, for the purpose and substantially in the manner set forth.

4. In a galvanic battery, an electronegative element consisting of a carbon electrode having flat bearing-surfaces in a common oblique plane converging upward with relation to a vertical line, passing through the body of the electrode, said carbon electrode being formed with a depression between said oblique bearing-surfaces for the circulation of fluid between the electrode and conglomerate material applied thereto, a slab of conglomerate material resting against said oblique bearing-surfaces, and a surrounding band binding the said electrode and slab of conglomerate together in such manner that the weight of the slab is utilized, in conjunction with the oblique bearing-surfaces, to keep the band taut, for the purpose and substantially as set forth.

5. In a galvanic battery, an electronegative element consisting of an inverted-wedge-shaped carbon electrode N, formed with oblique bearing-surfaces $n'$, $n'$, converging upward toward the central vertical plane of the electrode, slabs D, D, of conglomerate material, and surrounding bands B, B, binding the slabs D, D, to the electrode N, whereby the weight of the slabs is utilized, in conjunction with the oblique bearing-surfaces $n'$, $n'$, to keep the bands B, B, taut, for the purpose and substantially in the manner set forth.

6. In a galvanic battery an electronegative element consisting of a carbon electrode having a flat bearing-surface in the form of an oblique plane converging upward with relation to a vertical line, passing through the body of the electrode, a slab of conglomerate material formed upon its inner side with a flat surface for contact with said oblique bearing-surface on the electrode, and on its outer side with a shoulder, and a surrounding band fitting under said shoulder and binding the said electrode and slabs of conglomerate together, whereby the weight of the slab is utilized, in conjunction with the oblique bearing-surface on the electrode, to keep the band taut, substantially as and for the purpose described.

7. In a galvanic battery, an electronegative element consisting of a carbon electrode N, formed with oblique bearing-surfaces $n'$, $n'$, converging upward toward the central vertical plane of the electrode, slabs D, D, of conglomerate material formed with shoulders $d'$, $d'$, and surrounding bands B, B, fitting under said shoulders $d'$, $d'$, and binding the slabs D, D, to the electrode N, whereby the weight of the slabs D, D, is utilized, in conjunction with the oblique bearing-surfaces $n'$, $n'$, to keep the bands B, B, taut, substantially as and for the purpose set forth.

HORATIO J. BREWER.

Witnesses:
D. W. GARDNER,
GEO. WM. MIATT.